United States Patent [19]

Franson

[11] Patent Number: 5,243,649
[45] Date of Patent: Sep. 7, 1993

[54] APPARATUS AND METHOD FOR QUANTUM MECHANICAL ENCRYPTION FOR THE TRANSMISSION OF SECURE COMMUNICATIONS

[75] Inventor: James D. Franson, Ellicott City, Md.

[73] Assignee: The Johns Hopkins University, Baltimore, Md.

[21] Appl. No.: 953,326

[22] Filed: Sep. 29, 1992

[51] Int. Cl.$^5$ .............................................. H04K 1/02
[52] U.S. Cl. ........................................ 380/9; 380/59; 359/244; 359/249; 356/351
[58] Field of Search ............... 380/9, 54, 59; 359/107, 359/108, 326, 244, 249, 579, 299; 356/351, 352, 222; 250/227.19, 423 P; 369/110

[56] References Cited

U.S. PATENT DOCUMENTS 3,764,807 10/1973 Pollack ........................... 359/326 X
3,914,618 10/1975 Harris .................................. 359/326
4,879,479 11/1989 Frazier et al. ....................... 359/326
5,104,222 4/1992 Kersey et al. .................. 356/351 X

OTHER PUBLICATIONS

"Quantum Cryptography Defies Eavesdropping"; Collins, Gary; Physics Today; Nov. 1992; pp. 21-23.
"Quantum Public Key Distribution System"; IBM Technical Disclosure Bulletin; vol. 28, No. 7 Dec. 1985.
"Violations of a New Inequality for Classical Fields"; John Hopkins University Letter; Feb. 1992, pp. 23-32.

Primary Examiner—Tod R. Swann
Attorney, Agent, or Firm—Francis A. Cooch

[57] ABSTRACT

An apparatus and method that permit the transmission of secure communications. The invention uses quantum mechanical effects to establish nonlocal correlations between a pair of photons. This is analogous to an automatic encryption code that exists at only one location and is immediately destroyed after either of the photons is detected. This latter feature also provides a means for detecting any unauthorized tap on the transmission line.

19 Claims, 6 Drawing Sheets

APPARATUS AND METHOD FOR QUANTUM MECHANICAL ENCRYPTION FOR THE TRANSMISSION OF SECURE COMMUNICATIONS

STATEMENT OF GOVERNMENTAL INTEREST

This invention was made with Government support under Contract No. N00039-89-C-530i awarded by the U.S. Navy Department. The Government has certain rights in this invention.

BACKGROUND OF THE INTENTION

The invention consists of an apparatus and method that use quantum-mechanical effects to permit the transmission of secure communications without the need for encryption codes.

Classically, the transmission of a secure/classified message requires encoding the message before transmission and decoding the message after its receipt. The necessary equipment and the distribution and use of the necessary codes is expensive and inconvenient and tends to limit the use of encrypted communications.

More importantly, there have been instances in which topsecret crypto codes have been divulged to the Soviet Union over a period of many years. The damage caused to the national security by the disclosure of these codes is a very real problem, and any method to eliminate the need for such codes would be of considerable importance.

SUMMARY OF THE INVENTION

The quantum-mechanical effects used in the present invention allow the transmission of secure communications without the need for encryption codes. Roughly speaking, quantum mechanics establishes nonlocal correlations between a pair of photons which are somewhat analogous to an automatic encryption code that exists at only one location and is immediately destroyed after either of the photons is detected. The latter feature also provides a means of determining whether or not there has been any unauthorized attempt to tap into the transmission line.

For a more complete appreciation of the invention, attention is invited to the following detailed description of a preferred embodiment of the invention taken with the figures of the drawings. The scope of the invention, however, is limited only through the claims appended hereto.

BRIEF DESCRIPTION OF THE DRAWINGS

FIG. 7 illustrates an additional embodiment of the invention.

DETAILED DESCRIPTION OF THE PREFERRED EMBODIMENT

Figure 1:
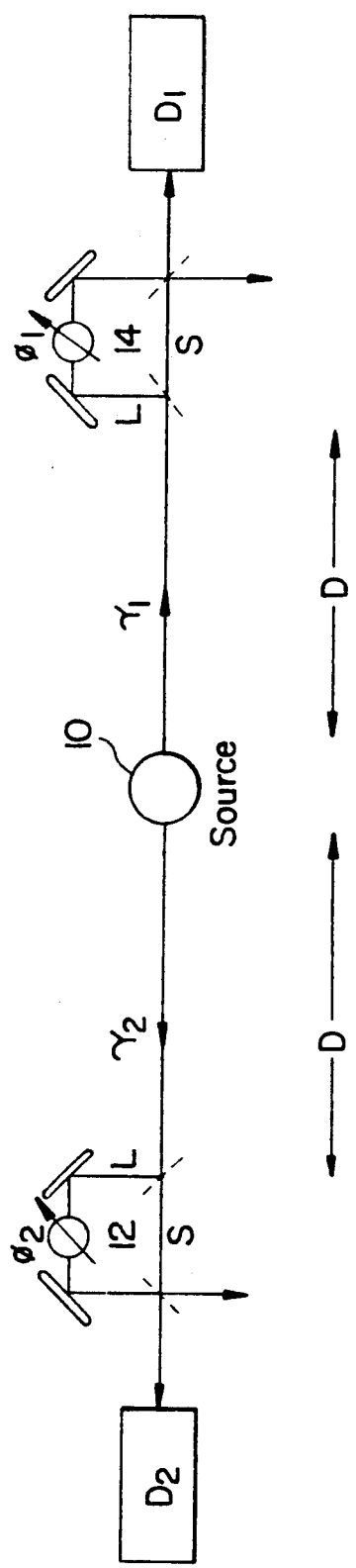
FIG. 1 illustrates a typical embodiment of the quantum mechanical encryption apparatus of the invention.

An illustrative embodiment of the invention is shown in FIG. 1 of the drawings.

A light source 10, (typically a nonlinear crystal) emits a pair of photons $\gamma_1$ and $\gamma_2$ that are very nearly coincident, although the time at which they are emitted remains uncertain in the quantum-mechanical sense. After traveling a large distance D, the photons encounter two identical interferometers 12, 14 that have a shorter path of length S and a longer path of length L. The path-length difference $\Delta l = L-S$ is chosen to be much larger than the first-order coherence length. Phase shifts $\phi_1$ and $\phi_2$ are introduced in the two longer paths. For experimental purposes, two mirrors (not shown) can be used to reflect the photons back towards the source, so that the optical path lengths, D, can be much larger than the actual separation between the two detectors.

In the case in which coincident photons are observed in detectors $D_1$ and $D_2$ with a time resolution much better than the difference in travel times $\Delta T = \Delta l/c$, where c is the speed of light, then both photons must have traveled over the shorter paths or both photons must have traveled over the longer paths. Interference between the quantum-mechanical probability amplitudes for those two possibilities results in a coincidence rate given by $$R_c = \tfrac{1}{4} R_{c0} \left[ \cos^2 \left[ \frac{\phi_T + \omega_0 \Delta T}{2} \right] \right], \quad (1)$$

where $\omega_0$ is the frequency of the pump laser, $\phi_T = \phi_1 + \phi_2$, and $R_{c0}$ is the coincidence rate with the beam splitters removed.

Although Equation (Eq.) (1) violates Bell's inequality, the time resolution of the coincidence circuits is often much worse than $\Delta T$, in which case there is also an incoherent contribution to the coincidence rate corresponding to situations in which one of the photons traveled along the longer path while the other photon traveled along the shorter path. The coincidence rate is then given by $$R_c = \tfrac{1}{4} R_{c0} \left[ \cos^2 \left[ \frac{\phi_T + \omega_0 \Delta T}{2} \right] + \frac{1}{2} \right]. \quad (2)$$

In an experiment, the resolution of the coincidence circuit used in the invention was 3 nanoseconds while $\Delta T$ was 132 picoseconds, which corresponds to the conditions of Eq. (2) rather than Eq. (1). The visibility of the corresponding interference pattern was therefore insufficient to violate Bell's inequality but will be seen to violate the classical inequality discussed in J. D. Franson, Phys. Rev. Lett. 67, 290(1991).

Figure 2:
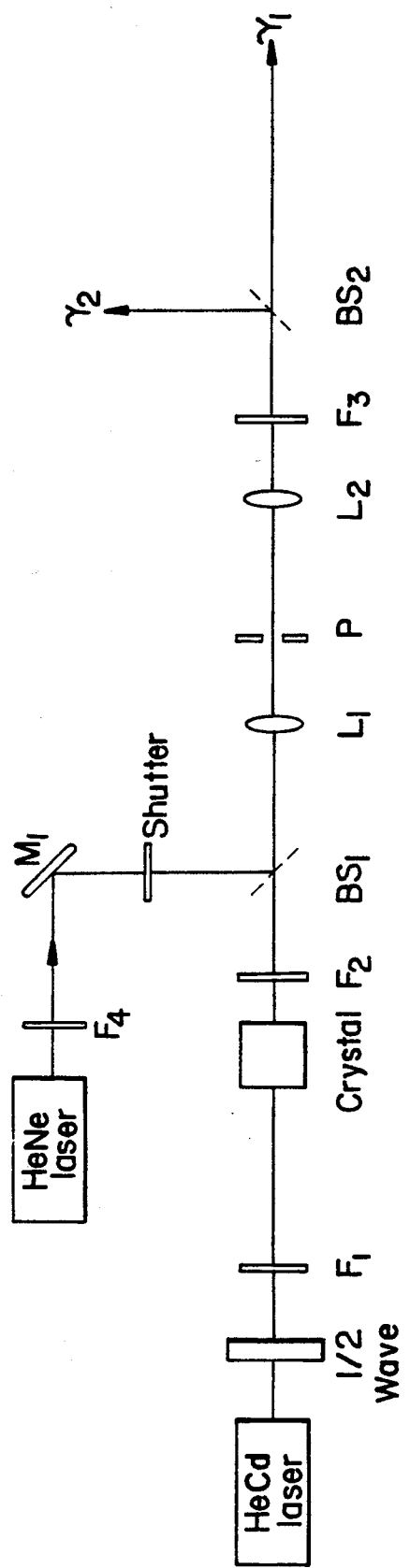
FIG. 2 illustrates the invention's parametric down-conversion light source.

The design of the light source 10 is illustrated in FIG. 2. The light from a helium-cadmium laser operating at a wavelength of 325 nanometers is incident upon a half-wave plate used to rotate the polarization of the light from the vertical plane to the horizontal plane. Filter $F_1$ passes the ultraviolet light from the laser but attenuates any visible light produced in the gas discharge tube.

A nonlinear crystal of lithium iodate converts a small fraction of the pump photons into coincident pairs of photons $\gamma_1$ and $\gamma_2$ via parametric down conversion. The pump power is 5 milliwatts and the crystal is 1 cm thick. The orientation of the crystal is automatically adjusted by a personal computer to satisfy the phase-matching conditions necessary to produce downconverted photons traveling in very nearly the same direction as the incident pump beam (degenerate type-I process).

Filter $F_2$ then absorbs the ultraviolet pump photons with very little fluorescence and passes the visible down-converted photons, both of which have a wavelength centered around 650 nanometers. The singles counting rate is equal to the detector dark count whenever the crystal is rotated away from the phasematching angle, which demonstrates that the ultraviolet pump photons are completely eliminated by filter $F_2$ and that any fluorescence is negligible.

Lens $L_1$, a microscope objective, is mounted on a three-axis translator whose position can be controlled with a resolution of 0.1 μm by the computer. Proper positioning of the lens allows both photons to be focused through pinhole P with a 25 μm diameter. Achromatic lens $L_2$ then produces a collimated ($<10^{-4}$ rad) beam with a diameter of approximately 2.5 cm. Filter $F_3$ is an interference filter with a bandwidth of 10 nanometers centered on 650 nanometers (nm). Beam splitter $BS_2$ separates the two photons onto different paths toward the detectors; those events in which both photons travel along the same path produces no coincidence counts and can be neglected.

The light from a helium-neon laser is attenuated by neutral density filter $F_4$ before being imaged onto pinhole P by means of mirror $M_1$ and beam splitter $BS_1$. This is used in the alignment of the apparatus and in stabilizing the interferometers against thermal drift, as will be described below. When not in use the HeNe beam can be blocked off by a shutter under the control of the computer.

The large distances between the source and the interferometers require that both light beams be very well collimated. That, in turn, results in a relatively low coincidence rate typically on the order of one event every 3 min. Because of the low counting rates, the interferometers have to be extremely stable over long periods of time. In addition, it is desirable that the interferometers be constructed in such a way that their alignment can not change when they are moved from one location to another.

Figure 3:
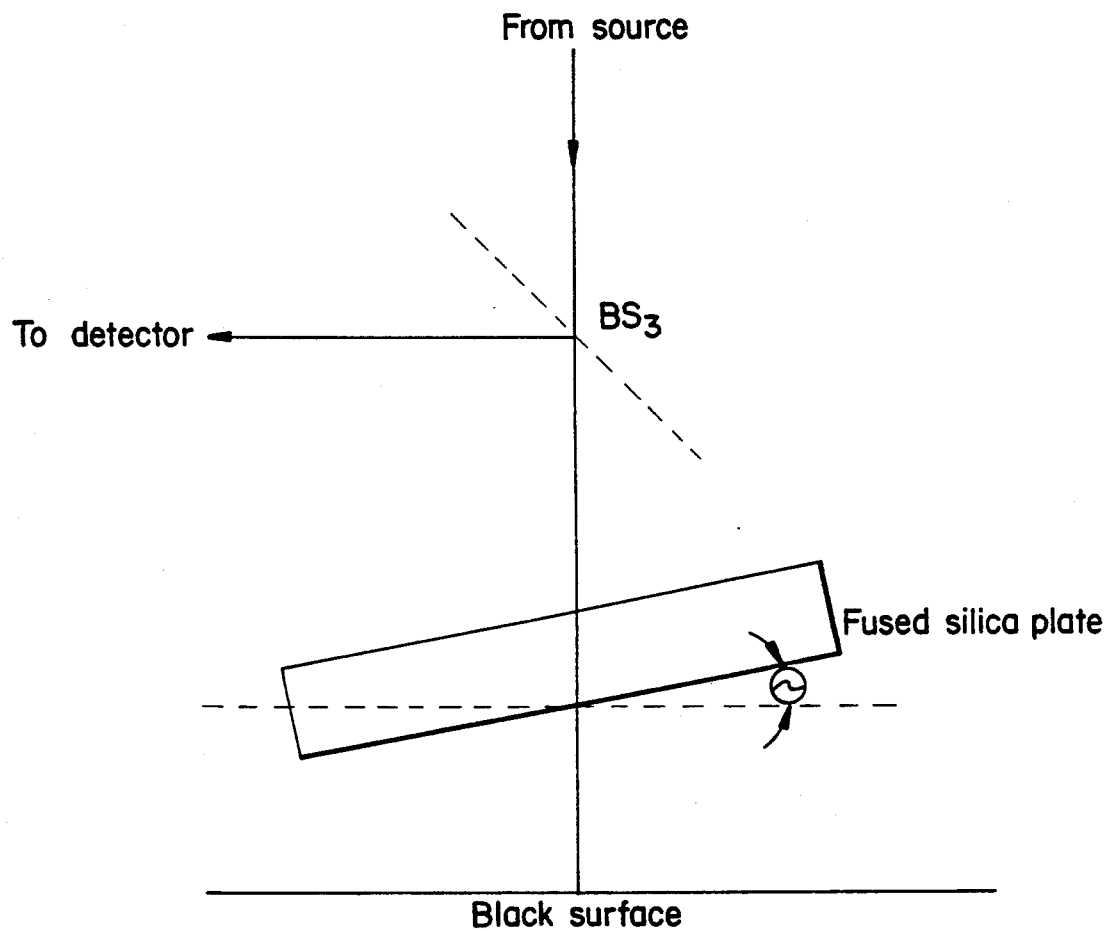
FIG. 3 illustrates the design of the invention's interferometers.

Each interferometer is therefore constructed from a solid plate of fused silica, as illustrated in FIG. 3. One of the collimated light beams from the source is incident upon the fused silica plate at very nearly a normal angle of incidence. Reflections from the front and back surfaces of the plate, both of which are coated with a dielectric giving 17% reflectance, produce a uniform interference pattern. The phase of the interference pattern can be controlled by the computer by rotating the plate through a small angle $\theta$. Most of the incident light is transmitted and absorbed by a black surface behind the plate. Beam splitter $BS_3$ is necessary to extract the reflected beam from the incident beam, although it does not form part of the interferometer itself. In an experiment, all the data was collected within one fringe of $\theta = 0$.

The front and back surfaces of the fused silica plates are within 1/20 wavelength, giving a total wave front distortion of less than 1/10 wavelength upon reflection or transmission. The visibility of the usual (first-order) interference pattern observed using the HeNe laser and a single detector is typically 90% and is limited primarily by the reflective coatings. The fused silica plates used in the two interferometers have equal thicknesses (13.6 mm) to within one wavelength, having been cut from a single polished plate.

The main advantage of this kind of interferometer is its long-term stability. The phase shifts of both interferometers are periodically monitored by the computer using the HeNe laser and adjusted as needed by changing the angle $\theta$. The observed phase shifts at $\theta = 0$ varied by roughly one fringe throughout the course of an entire experiment as the result of temperature changes in the laboratory. The wavelength of the down-converted photons (650 nm) is sufficiently close to that of the HeNe laser (632.8 nm) that the corresponding phase shifts differed by an unknown constant that depends upon the exact thicknesses of the plates. Since the path-length difference never varies by more than one wavelength, the small difference in wavelengths is negligible over that range. Thus, the phase shifts measured with the HeNe laser provide a direct measurement of $\phi_1$ and $\phi_2$, aside from a fixed but unknown offset.

It would have been desirable in the experiment, mentioned above, to have the two photons travel in opposite directions toward the two detectors. That was not possible due to the limited size of the laboratory and, instead, both beams traveled side down a long (~25 m) metal enclosure to two mirrors which reflected the beams back towards the source. The optical path length D was 51 m while the actual separation of the two beams was 20 cm.

The data was collected by setting the two interferometers to a series of phase shifts (as measured with the HeNe laser) ranging from 0° to 360° in 45° increments. These phase settings were changed roughly every 2 min. for one interferometer and every 3 min. for the other, so that there was no synchronization between the two settings. The number of coincidence counts obtained for each such pair of settings was recorded by the computer, along with the difference in detection times. Photon counts differing by more than 4.5 ns were rejected as accidental. The accidental rate was simultaneously determined from the events outside that range and subtracted off; the accidental rate was typically a factor of 10 less than the true coincidence rate. The coincident events were also put into bins based on the sum of the phases of the two interferometers. All data collection was performed automatically by the computer over a total time interval of 98 hours and no data editing or selection was performed.

Figure 4:
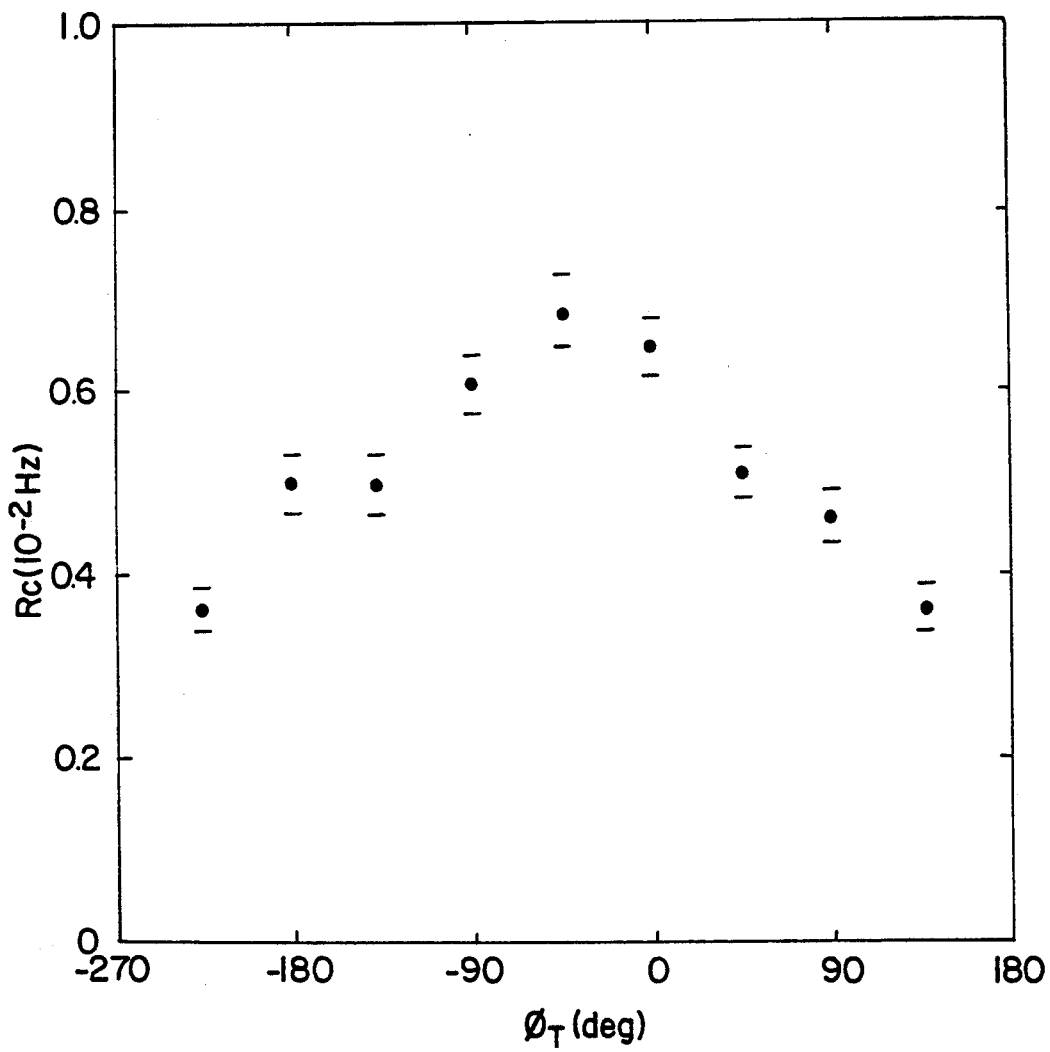
FIG. 4 illustrates coincidence data obtained from the invention for a large optical path lengths (D=51 m).

The coincidence data obtained at a large optical path length (D=51 m) are shown in FIG. 4. Here $\phi_1$ is the sum of the phases of the interferometers as measured with the HeNe laser, which differs from the corresponding phase at the wavelength of the down-converted photons by an unknown constant, as discussed above. A peak in the coincidence rate can be seen at approximately −45°, indicating that the thicknesses of the two plates were such that the difference between the phases at the two wavelengths happened to have that value. Measurements made at a shorter distance (D=0.55 m) gave the same offset in phase.

The single-photon counting rates in both detectors were recorded in a similar fashion and it should be emphasized that they showed no measurable modulation or interference, as expected. The only interference observed was in the coincidence rate and it depended only on the nonlocal sum of the two phases.

The visibility of an interference pattern is defined by $$v = \frac{R_{max} - R_{min}}{R_{max} + R_{min}}, \quad (3)$$

where $R_{max}$ and $R_{min}$ are the maximum and minimum counting rates. The data of FIG. 4 give a value of $\mu = 0.31 \pm 0.04$. Although Eq. (2) predicts a visibility of 0.5, the expected visibility can be shown to be reduced to 0.336 by the finite coherence length (10 cm) of the pump laser, given a difference in optical path lengths of $\Delta l = 3.97$ cm as determined from the thickness of the plates and the index of refraction. The expected visibility should be further reduced by roughly 10% due to the limited perfection of the optics, giving an overall expected visibility of 0.30. Thus, the observed visibility was in good agreement with the quantumthoery prediction.

Data were also collected with the two interferometers located as close as possible to the light source, which corresponded to $D = 0.55$ m. The results obtained were similar to that shown in FIG. 4 and gave a visibility of $0.27 \pm 0.04$, which is consistent with the visbility measured at the larger distance to within the experimental uncertainty. Thus, there is no indication that the nonlocal correlations are reduced due to a collapse of the wave function over larger distances.

The visibility of the interference pattern of FIG. 4 is not sufficiently high to violate Bell's inequality. Nevertheless, it was recently shown that the predictions of any classical or semiclassical field theory for two-photon interferometer experiments of this kind must satisfy the following inequality:

$$v \leq \frac{R_{co}(\Delta T)}{R_{co}(0) + R_{co}(\Delta T)}. \quad (4)$$

Here $R_{co}(\Delta T)$ is the coincidence rate that would be obtained with the beam splitters removed and at a delay time of $\Delta T$ using coincidence electronics with unlimited time resolution. When the interferometer measurements are performed using relatively large coincidence windows, as was the case in this experiment, Eq (4) can be generalized to $$v \leq \frac{\int_{\Delta T/2}^{\infty} R_{co}(\tau)d\tau + \frac{1}{2}\int_{\Delta T/2}^{3\Delta T/2} R_{co}(\tau)d\tau}{2\int_{0}^{\infty} R_{co}(\tau)d\tau}. \quad (5)$$

It is well known that the pairs of photons emitted in parametric down conversion are highly coincident. Direct timing measurements have shown that the photons are coincident to within at least 91 picoseconds (one standard deviation), while indirect measurements suggest that they are coincident to within a few femtoseconds. More recent direct measurements have shown that the photon pairs from parametric down conversion are coincident to within 50 picoseconds. Only the results of the direct timing measurements will be used here, since it is conceivable that there may be a classical model that can account for the indirect measurements without giving coincident pulses. In that case, the inequality of Eq. (5) limits the visibility in any semiclassical theory to 0.139 for the conditions of the present experiment. The experimentally observed visibility violates this limit by 4 standard deviations. Thus, there is no semiclassical theory consistent with all the experimental observations and these effects must be viewed as quantum mechanical in nature.

In summary, the coincidence rates in the two-photon interferometer experiment discussed above were measured with an optical path length of 102 m between the two interferometers. The coincidence rate showed an interference pattern that depended on the sum of the phases of the two interferometers, with a visibility that was in good agreement with the predictions of the quantum theory. The singles counting rates showed no modulation at all. The visibility exceeded that achievable in any semiclassical field theory, which indicated that the effects observed were quantum-mechanical in nature. No significant difference was observed between the visibilities obtained at optical path separations of 102 and 1.1 m, which provides some indication that the collapse of the wave function is not dependent upon the distance over which it occurs and that the quantum theory remains valid when extrapolated to distances many orders of magnitude larger than atomic dimensions.

It has occasionally been suggested that the collapse of the wave function may be a dynamic process, presumably nonlinear in nature, in which case it would be confined to those regions of space where the wave function is nonvanishing. In that case, the collapse of the wave function would propagate only along the optical paths of the two photons and the fact that the spatial separation between them was relatively small in this experiment would be of no significance. The results of this experiment are relevant to theories of that kind but do not rule out the more general situation.

In the above embodiment secure communications can be sent by establishing a code based on emitting a certain number of photons and measuring their coincidence rate. Once established, the code can then be used to transmit secure communications with the same inability to tap in and "listen" as described below. This is due to the fact that the two photons shown in FIG. 1 are totally correlated when $\phi_1 = \phi_2$ in the sense that one will be detected in detector $D_1$ and the other in $D_2$, or both will travel along the direction at the arrows to two other detectors $D_1'$ and $D_2'$ (not shown). If detection in the unprimed detectors is taken to be a bit "o" while detection in the primed detectors is taken to be a bit "1", then these correlations establish a shared secret key or code. That can then be used to encode and decode messages sent over an open communication link. The experiment described above is the first demonstration of this ability over large separations.

Figure 5:
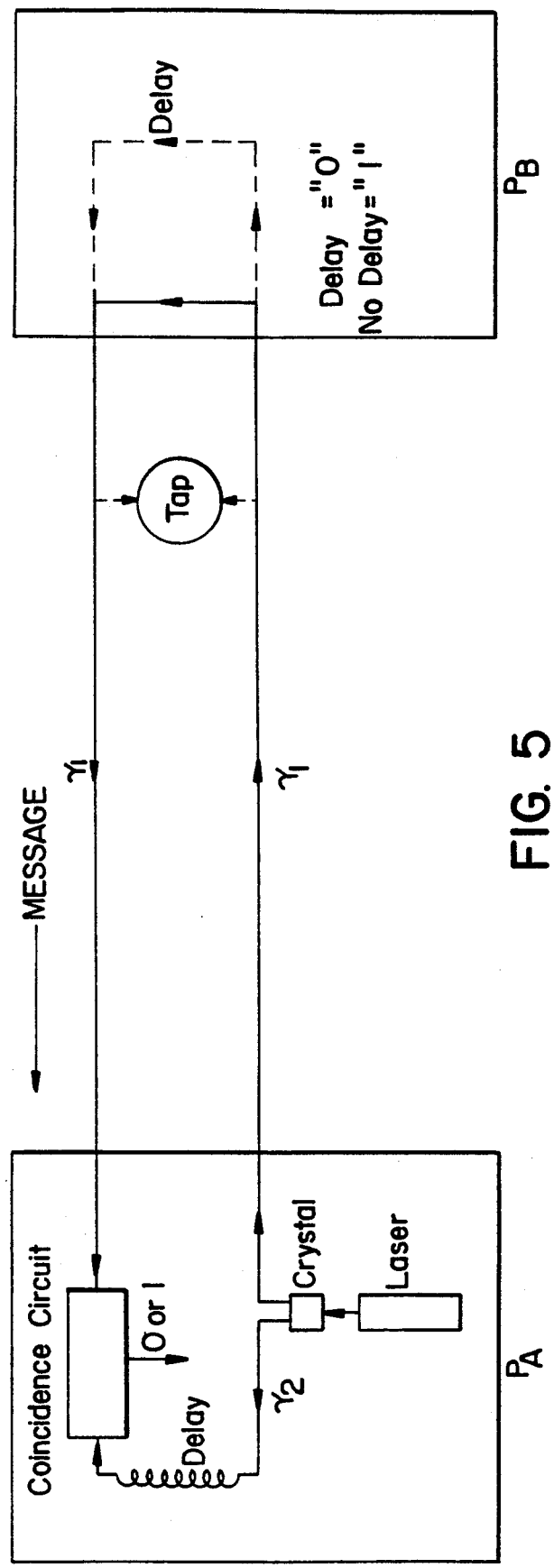
FIG. 5 illustrates a second embodiment of the invention for transmitting secure communications without an encryption code.

Another embodiment of the invention is illustrated in FIG. 5. Assume that an observer at location $P_B$ intendes to transmits a secure message to an observer at location $P_A$, as shown by the direction of the message arrow. $P_A$ will be equipped with a laser of frequency $\omega_0$ whose output passes through a nonlinear crystal (such as KDP), thereby producing coincident pairs of photons $\gamma_1$ and $\gamma_2$ with frequencies $\omega_1 + \omega_2 = \omega_0$ via parametric down-conversion. These photon pairs are emitted at random times, with $\gamma_1$ and $\gamma_2$ correlated in both time and energy.

$P_A$ then transmits $\gamma_1$ down an optical fiber toward $P_s$, while retaining $\gamma_2$ in an optical fiber delay line of the same length contained in his own secure area; $\gamma_2$ will later serve as the decoding "key". $P_B$ then transmits a bit of information by either reflecting $\gamma_1$ back to $P_A$ down a second optical fiber with no additional delay (bit "1"), or delaying $\gamma_1$ by a few nanoseconds before sending it back (bit "0"). $P_A$ can then "decode" the message by comparing $\gamma_1$ and $\gamma_2$; if the photons are coincident, the message bit is "1", whereas the message bit is "0" if they are not coincident. Note that the stream of $\gamma_1$ photons returning to $P_A$ would appear to be a random sequence (white noise) with or without a delay added.

Now consider the information that can be obtained by an unauthorized set of taps as shown in FIG. 5. If classical pulses of light were being transmitted down the optical fibers instead of single photons, then one tap could be used to monitor the pulses going into $P_B$ while the other tap could be used to monitor the pulses leaving $P_B$, thus determining the time delay introduced by $P_B$ and reading the bit transmitted. But no such possibility exists for single photons, which can be detected only once; any photons observed by the first of the taps will be eliminated and therefore not modulated by $P_B$. Thus does the quantum-mechanical difference between single photons and classical pulses of light allow for secure communications.

The quantum-mechanical correlations used by the invention would be destroyed if an unauthorized person made any kind of measurements or observations on $\gamma_1$ via a tap. This allows $P_A$ to continuously check for any unauthorized attempts at tapping the line. This capability is a result of the general property of quantum mechanics that any measurement on a particle or system unavoidably destroys the initial state of that system. The two-photon interference effects allow a practical means of making these checks for unauthorized taps.

Figure 6:
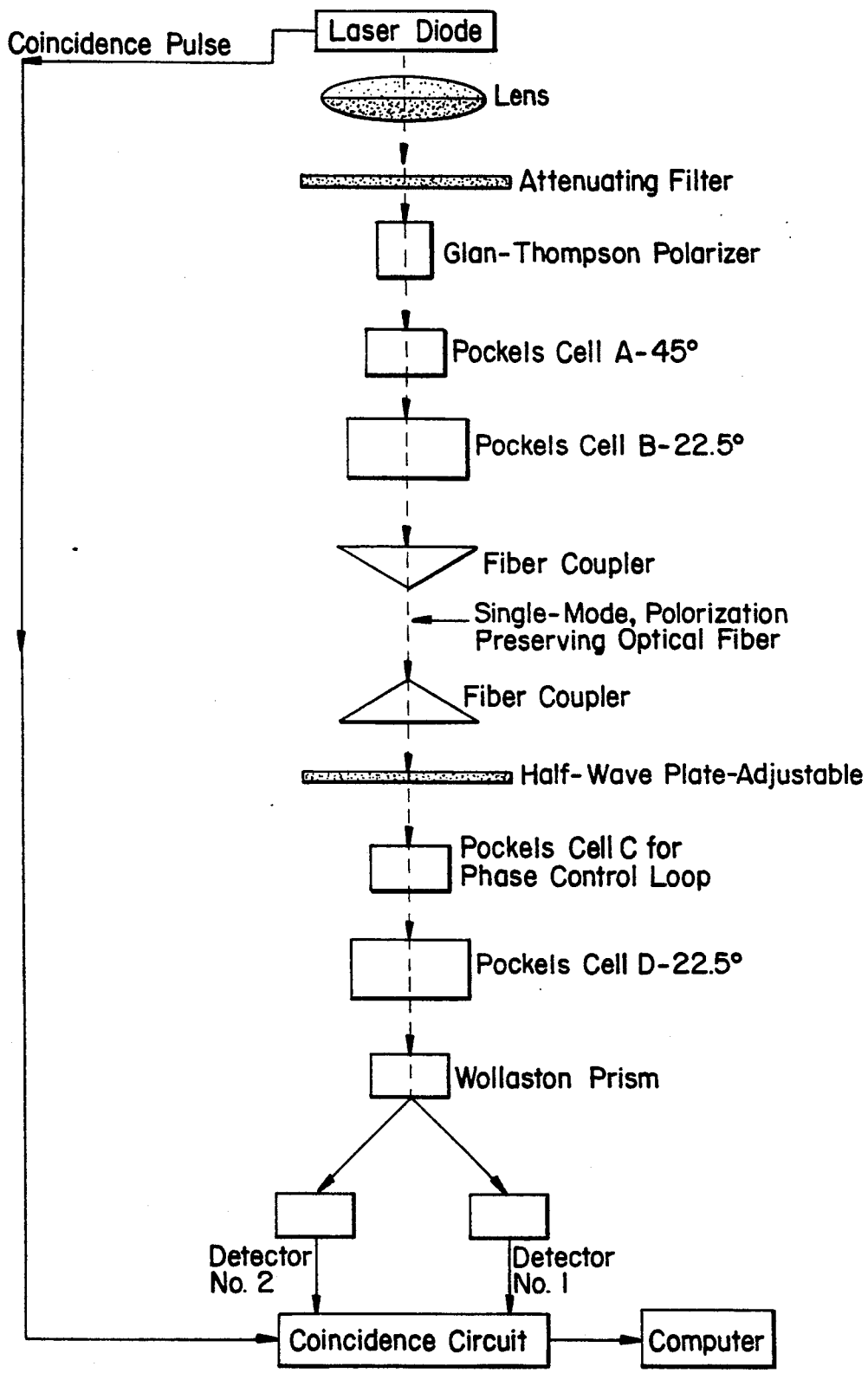
FIG. 6 illustrates an additional embodiment of the invention which uses proton polarization.

Another embodiment of the invention consists of using photon polarizations. This approach uses a pulsed laser which produces a single photon by attenuating a high-intensity pulse. Using pockels cells, one observer rotates the polarization of the photon through an angle $\theta$. A second observer measures the polarization and will obtain total correlation (same polarization). Any interception of the photon will destroy the correlation. As shown in FIG. 6, the design incorporates four pockels cells, polarization preserving optical fiber, and feedback loop for phase drift compensation. The advantages of this embodiment include high data rates compact, inexpensive laser; and good coupling to optical fibers.

I claim:

1. An apparatus for the quantum mechanical encryption for the transmission of secure communications comprising:
    a light source for emitting a pair of photons, said photons being coincident to within at least 91 picoseconds;
    two identical interferometers, each of the interferometers receiving one of the photons; and
    two detectors for observing the photons.

2. The encryption apparatus as recited in claim 1, wherein the light source is a nonlinear crystal.

3. The encryption apparatus as recited in claim 1, wherein each of the interferometers has a shorter path length (S) and a longer path length (L).

4. The encryption apparatus as recited in claim 3, further comprising means for introducing phase shifts on path L of each of the interferometers.

5. The encryption apparatus as recited in claim 3, wherein the difference in length between paths S and L is much larger than the first-order coherence length.

6. The encryption apparatus as recited in claim 1, further comprising means for increasing an optical path length traveled by the photons to a distance much larger than the distance between the detectors.

7. The encryption apparatus as recited in claim 6, wherein said increasing an optical path length means comprises at least two mirrors.

8. The encryption apparatus as recited in claim 1, further comprising a means for carrying the photons, the carrying means connecting the light source to the interferometers.

9. The encryption apparatus as recited in claim 8, wherein the carrying means comprises optical fiber.

10. The encryption apparatus as recited in claim 1, wherein the light source further comprises:
    a helium-cadmium laser producing light at a wavelength of 325 nanometers;
    a half-wave plate for rotating the polarization of the laser light from the vertical plane to the horizontal plane;
    a first filter for passing ultraviolet light from the laser and for attenuating any visible laser light;
    a nonlineal crystal of lithium iodate for converting a plurality of pump photons into the coincident pairs or photons via parametric down conversion;
    a second filter for absorbing the ultraviolet pump photons and passing the visible pairs of photons;
    a first lens for focusing the pairs of photons;
    a pinhole for receiving the pairs of photons from the first lens;
    a second lens for producing a collimated beam of the pairs of photons;
    an interference filter; and
    a first beam splitter for separating each of the pairs of photons onto different paths toward the detectors.

11. The encryption apparatus as recited in claim 10, wherein the light source further comprises:
    a helium-neon laser for producing light;
    a neutral density filter;
    a mirror for receiving the light from the neutral density filter; and
    a second beam splitter for sending the light to the pinhole for aligning the encryption apparatus and stabilizing the interferometers against thermal drift.

12. The encryption apparatus as recited in claim 1, wherein each of the interferometers comprises a solid plate of fused silica.

13. The encryption apparatus as recited in claim 12, wherein the front and back surfaces of the silica plate are coated with a dielectric giving approximately 17% reflectance producing a uniform interference pattern.

14. The encryption apparatus as recited in claim 13, wherein the interference pattern is controlled by a computer rotating the plate through an angle.

15. The encryption apparatus as recited in claim 14, further comprising a black surface behind the silica plate for transmitting and absorbing the incident light.

16. The encryption apparatus as recited in claim 15, further comprising a third beam splitter for extracting the reflected beam of light from the incident beam of light.

17. An apparatus for the quantum mechanical encryption for the transmission of secure communications comprising:
    a light source for emitting a photon, said photon having a polarization;
    means for rotating the polarization of the photon;

means for compensating for phase drifts in an optical fiber; and means for measuring the polarization of the phonton.

18. The encryption apparatus as recited in claim 17, wherein the rotating means comprises a pockels cell.

19. A method for the quantum mechanical encryption for the transmission of secure communications comprising the steps of:

emitting a pair of photons from a light source, said photons being coincident to within at least 91 picoseconds;

receiving each of the photons in identical interferometers; and observing the photons after passing through the interferometers.

* * * * *